United States Patent [19]

Blaser

[11] Patent Number: 5,086,964
[45] Date of Patent: Feb. 11, 1992

[54] DUAL DRIVE WEB FEED APPARATUS AND METHOD

[75] Inventor: Giles R. Blaser, Green Bay, Wis.
[73] Assignee: Amplas, Inc., Green Bay, Wis.
[21] Appl. No.: 314,905
[22] Filed: Feb. 24, 1989

Related U.S. Application Data

[63] Continuation-in-part of Ser. No. 226,398, Jul. 29, 1988, abandoned.

[51] Int. Cl.⁵ .............................................. B65H 20/00
[52] U.S. Cl. .................................... 226/108; 226/24; 226/4; 226/123; 318/7
[58] Field of Search ................ 226/4, 10, 24, 108, 226/122, 123; 318/6, 7

[56] References Cited

U.S. PATENT DOCUMENTS

| | | | |
|---|---|---|---|
| 3,013,707 | 12/1961 | Beachler | 226/108 |
| 3,025,240 | 3/1962 | Sorkin | 226/123 X |
| 3,518,857 | 7/1970 | Hancook et al. | 242/57 |
| 3,672,600 | 6/1972 | Carlson et al. | 318/6 X |
| 3,734,368 | 5/1973 | Kudelski | 318/7 X |
| 3,809,335 | 5/1974 | Martey | 318/7 X |
| 4,192,705 | 3/1980 | Wech | 226/122 X |
| 4,331,275 | 5/1982 | Therien | 226/122 X |
| 4,801,853 | 1/1989 | Lewis et al. | 318/7 |

Primary Examiner—Daniel P. Stodola
Assistant Examiner—Paul T. Bowen
Attorney, Agent, or Firm—Andrus, Sceales, Starke & Sawall

[57] ABSTRACT

A web drive cyclically moves a web a fixed distance. First and second spaced draw roll units include separate servo motors. Separate programmed controllers are connected to energize the servo drives with a time motion profile including acceleration and deceleration periods to move the web in a fixed time period. The one programmed controller generates the profile program each cycle during the execution of program to move the web the next cycle. The generated program is downloaded to the second controller to duplicate energization of the second servo motor. A dancer unit between the drive rolls maintains the tension with a change in web length and includes a movable roll unit. A potentiometer sensor is coupled to the roll unit and establishes an output signal voltage proportional to the direction of the web change and to the length thereof. The second controller includes a drive modifying program connected to the sensor and responsive to the signal voltage to change the second drive profile for the second servo motor for the next succeeding web feed and compensates for the change in web length and move the web in accordance with the modified drive profile. The potentiometer sensor is disabled during a continuous or jog run and serves to hold the web tension.

17 Claims, 6 Drawing Sheets

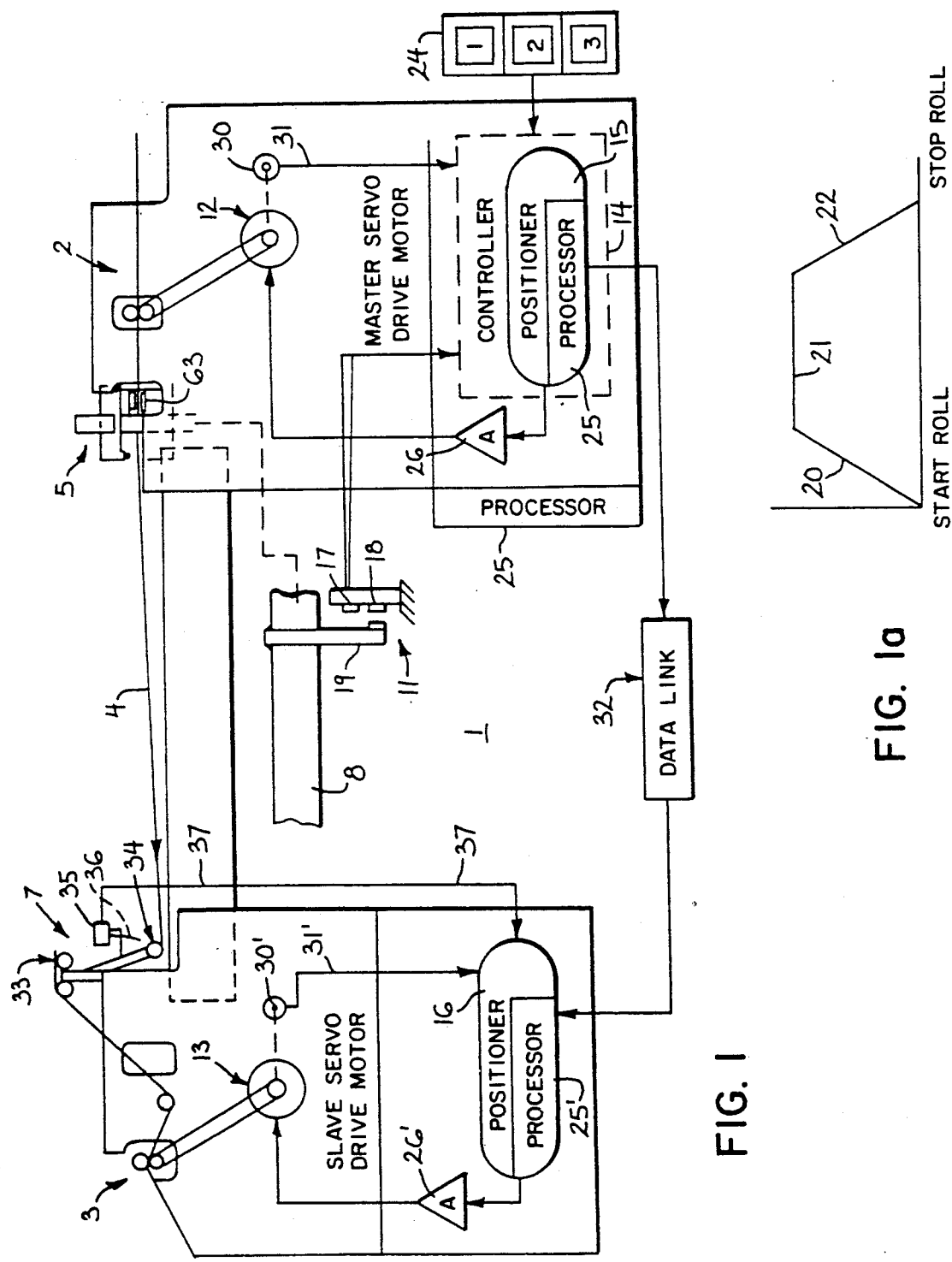

to down time and parts cost associated with such apparatus.

There is therefore a very significant need and demand for an improved drive system which can provide a rapid response to any change in the web length and preferably which will avoid the high maintenance cost associated with the prior art mechanical drive modification.

DUAL DRIVE WEB FEED APPARATUS AND METHOD

RELATED APPLICATION

This is a continuation-in-part of Ser. No. 07/226,398, filed July 29, 1988, now abandoned, entitled Intermittent Web Feed Apparatus, and assigned to a common assignee.

BACKGROUND OF THE INVENTION

This invention relates to a dual drive web feed apparatus and method for intermittent moving of a web and particularly for positioning a web in a web working machine such as bag forming machine.

In the formation of successive similar elements from a web of paper, film or other material, a continuously moving web may be intermittently moved to locate successive lengths of the material through a forming machine in a time stepped manner. A particularly satisfactorily intermittent feed drive is disclosed in the above identified application of the inventor. The above application particularly discloses a drive having a programmed logic controller for producing a very controlled intermittent direct drive of the web. The web feed mechanism includes a draw roll drive with the programmed logic controller which creates a drive profile for each web feed cycle to provide a controlled acceleration of the drive means to a maximum drive speed followed by a deceleration of the drive means to a stop position within the available drive time, thereby providing for a controlled movement of the web. The programmed controller as disclosed therein processes the necessary input signals based on a previous cycle to establish a motion profile of the motor servo drive during each drive period and establishes a highly effective and efficient actuation of the drive means within the total time available to move the web.

In various applications, a precise length of material is to be moved each step and a controlled tension is desired in the web during the working of the web. Various applications may require a constant high, low intermediate tension. In order to create a controlled tension system, an upstream drive and a downstream web drive such as individually driven sets of draw rolls may be coupled to the web and operated in synchronism to simultaneously move the web through the unit and hold the web in place during processing with the required tension on the web. This requires accurate synchronized movement of the draw rolls and coupling to the web to provide precise stepping of the web while maintaining the desired tension. Various prior art systems generally similar to those used in controlling a single draw roll drive have been suggested. Thus, in a known system, two sets of draw rolls are coupled to the web and an electromagnetic clutch and brake system controls the master or upstream draw rolls. A variable ratio cone and pulley drive couples the downstream drive rolls to the upstream drive. A variable ratio setting, controlled either manually or by a dancer unit, changes the drive ratio slightly to maintain a constant length of web in each intermittent stepped drive. Although such systems have been used, the systems have rather significant commercial implications and limitations as to cost, accuracy and repeatability. Thus, the mechanical components used have a relatively high inertia thereby limiting the response and speed of correction. In addition, the systems present relatively costly maintenance, both

SUMMARY OF THE PRESENT INVENTION

The present invention is particularly directed to a dual servo drive system including a master drive unit and a slave drive unit mounted in spaced relation and coupled to the web to provide synchronized and controlled web movement with a web characteristic monitored and maintained during the movement of the web through the apparatus. A tension control unit may be coupled to the web between the two controlled drive units. The one drive unit is the master drive and in accordance with past practice is generally the upstream drive unit. The stepping parameters are inputted to a master servo positioner unit, preferably such as disclosed in the co-pending parent application. The master servo positioner generates the necessary energizing input to the master motor for creating a preferred profile of the motor output and web motion for moving the web within a fixed web moving period. The second or slave drive unit receives the identical motion profile program from the master positioner. Thus, the program is down loaded from the master servo positioner into the drive program of the slave positioner, which of course includes the program to execute such drive program. The slave positioner may be a duplicate of the master unit such that either drive units such as sets of draw rolls may be used as the master and the opposite set used as the slave. In addition, the dancer, other tension control unit or web accummulating and control unit is coupled to the web between the drive units. Any change in the web length is reflected in a change in the control unit position, either directly or in a tension control unit to maintain the necessary desired low or other selected tension in the web. A web sensor unit is coupled to the control unit and provides a control signal proportional to any change in the length of the web. The output signal of the web sensor unit has a changing characteristic, such as voltage level, frequency or other parameter in accordance with the change in length of the web. This control signal is read by the slave drive positioner which modifies the down-loaded program as received from the master positioner to oppositely and correspondingly modify the slave drive program to compensate for the erroneous length and to change the length of web in the next move to set the proper web length between the drive units at the next cycle of web movement. In summary, the slave drive precisely mimics the index functioning of the master drive, except for any necessary modification if the tension control dancer unit or other web monitor signals a change in web length.

More particularly in a preferred construction of the apparatus particularly where a low web tension is desired, the web monitor includes a very low inertia tension control dancer unit or other web take-up unit between the drive units for take-up and release of web to respond to variation in the tension forces and maintain the desired tension. The present invention has been applied to applications using a tension on the order of one pound or less. The master drive programmed controller and positioner is constructed as described in applicant's co-pending application, with the motor index profile calculated by a microcomputer or processor and placed in the master positioner and also down loaded to the slave positioner through a serial data link. As more fully described in the parent application, between web movement, the computer monitors and reads the inputs as to web length and other modifying signals and calculates the drive acceleration and deceleration profile for the next web feed. The master controller in this system functions in the same manner and in addition down loads such program to the slave positioner. The slave positioner modifies such profile program if the length has changed and the tension control dancer unit is not in the precise reference position. In the preferred apparatus, a simple potentiometer is coupled to the dancer unit and monitors the moving component of the dancer unit to sense its position from the set or reference position. The output of the potentiometer is a varying analog voltage precisely indicating the position of the dancer and thereby the length of web existing between the draw rolls. Any change in the analog voltage is a control signal corresponding to the change in length and the direction of change. The control signal is then used to modify the slave index profile in relationship to the master index profile such that at the next indexing the length of web fed is modified to compensate and remove the offset as reflected within the tension control dancer unit. The next web indexing results in location of the proper web length between the two draw rolls with the dancer unit returning to its appropriate web length position.

As in the prior system, the master and slave drive combination can be operated in a non-index mode with a continuous web feed speed or jogging web movement through the machine, such as during set-up or threading of the web through the machine. In the non-index mode, the dancer unit operates continuously to accumulate and release web between the master and slave nip rolls without changing the drive of the slave unit.

Although the slave index profile is preferably provided with an automatic response device such as a dancer potentiometer unit, any other system can of course be provided such as a manually set potentiometer, an analog signal generator or encoder or the like. In addition, a non-contact sensing device can be coupled to the dancer unit, other web indicating system such as a loop developed in the web if a tension control is not used or any other change in the web associated with a web length change to monitor its position and thereby provide a suitable output control signal. Various ultrasonic sensing devices, photodetecting devices, thermosensing devices and the like are available and can be coupled to the dancer unit or web to monitor its position and produce the necessary modifying signal to the slave drive unit.

Additional overriding controls can of course also be introduced. Thus, for example, it may be desired to change the tension and a suitable tension controlled device, such as a load cell or other tension measuring device, may be coupled to the web and provide further modification to establish and maintain a desired tension.

The present invention thus provides a simple, reliable and effective means for maintaining a constant compensation in the drive system for any change in the web feed as reflected in the repositioning of a tension control device or other web accummulating system. The present invention particularly provides a method and apparatus for significantly improving the quality of the product. Further, the servo drive system with the dancer tension control uses known devices and technology which operate reliably and have a long operating life, well within the requirements of present day technology.

BRIEF DESCRIPTION OF THE DRAWINGS

The drawings furnished herewith generally illustrate the best mode presently contemplated for carrying out the invention as hereinafter described.

In the drawings:

FIG. 1 is a simplied side elevational view of a web processing apparatus including a seal assembly and a web feed drive constructed in accordance with the teaching of the present invention;

FIG. 1a is a typical drive motion profile;

FIGS. 2b and 2c are a block diagram illustrating the electronic control system for controlling of the dual drive unit shown in FIG. 1 and the nozzle cooling system shown in FIG. 2a;

DESCRIPTION OF THE ILLUSTRATED EMBODIMENT

Figure 2A:
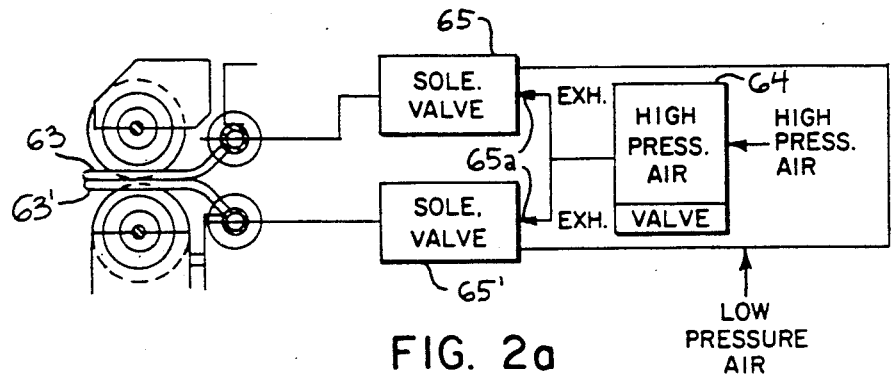
FIG. 2a is a diagrammatic illustration of a nozzle cooling system.

Referring to the drawings and particularly FIG. 1, a bag making machine 1 similar to that of the parent application is diagrammatically illustrated. The machine 1 includes a first set of web feed draw rolls 2 and a second set of web feed draw rolls 3 coupled to move a web 4 through the machine and particularly a seal bar unit 5 located between the two sets of draw rolls 2 and 3. The bar unit 5 extends across the complete width of the web and operates to transversely heat the web 4. In accordance with conventional practice, the web 4 is fed intermittently through the machine with variable dwell period during which the seal bar unit 5 is actuated. The sets of feed rolls 2 and 3 are intermittently rotated to advance the web 4 a set distance between the operating periods of the seal bar unit. The dual sets of feed draw rolls 2 and 3 are used to move the web 4 with a fixed tension in the web between the rolls 2 and 3 for properly holding the web during the working thereof. A tension control unit 7, shown as a known dancer unit 7, is coupled to the web 4 between the sets of draw rolls 2 and 3. Synchronized operation of the draw roll sets 2 and 3 should maintain a precise web length and tension. As a practical consideration, some slight change in web length may occur and the dancer unit 7 takes up and releases the web to maintain the desired tension.

The bar unit 5 is coupled to a continuously rotating machine main shaft 8 through a suitable cam unit, not shown, or other suitable mechanism to actuate the seal bar unit 5 between a raised standby position spaced from the web 4 and a lowered seal position engaging the web 4. The bar unit 5 is actuated within a portion of one revolution of the main shaft 8, and generally one-half revolution or less. The remaining period of the shaft is an available web move period for rotation of the draw rolls. A seal position switch unit 11 is coupled to the shaft 8 and provides electrical signals to control rotation of the two sets of draw rolls 2 and 3. The draw rolls 2 and 3 are driven by individual corresponding servo motors 12 and 13 which are operatively stopped during the actuation of the bar unit 5 and energized during the dwell period of unit 5.

In accordance with the present invention, the sets of feed rolls 2 and 3 are coupled to a programmed drive control system including a master controller 14 which includes a motor and web positioner unit 15 for energization the master servo motors 12 and a slave positioner unit 16 for energizing the slave motor 13. The control 14, as in the parent application, generates a profile of the motor output and the web movement during the dwell period of unit 5 and the positioner unit 15 executes the program. The program is also down loaded to positioner 16 to execute the program for corresponding drive of slave motor 13.

Switch unit 11 includes start and end cycle switches 17 and 18 which are coupled to an actuator 19 on the main shaft 8 and the switch operations identify the beginning and the end of the bar unit cycle, and inversely the start and stop cycle available points in the machine cycle for the indexing of the sets of feed rolls 2 and 3 and moving the web.

The web moving time period requires that the motor and rolls 2 and 3 are accelerated to a maximum speed and decelerated from such speed for desired moving the web a precise length. A graphical illustration is shown in FIG. 1a including an acceleration portion 20, a constant velocity portion 21 and a deceleration portion 22, with a registration profile as more fully set forth in the present application.

The length of web 4 fed to the seal bar unit 5 in the available period of each machine cycle is established by a length input unit 24, shown as a three thumb wheel digital input and mounted as a part of the control and accessible to the machine operator. Each wheel sets a switch unit, generating a digit related signal, which is sensed by the controller.

The length signal of unit 24 and the time length signals of switches 17 and 18 determine the basic parameters for moving the web. In the movement of the web 4, the dual set of feed rolls 2 and 3 should provide an appropriate rapid and smooth acceleration to a maximum speed and a similar deceleration for moving of the web with minimum shock loading on the motor and drive apparatus as well as effective and reliable grasping and movement of the web, as shown in FIG. 1a.

In accordance with the preferred embodiment of the present invention, the control system includes the master programmed controller 14 having a processor 25 programmed to detect the time spaced switch signals and the web length signals, and including characteristics and specifications of the motors and interrelated drive system. Based on such information, a master motor drive signal is created and connected to a master motor amplifier 26 for supplying power to the drive motor 12 from an incoming power supply. The drive signal is translated by the amplifier 26 to establish the smooth and rapid movement of the web 4 in accordance with a programmed profile, preferably using the total available time for moving of the web.

A feedback signal unit such as a resolver or encoder 30 is coupled to the master motor 12 for draw rolls 2. The output of the resolver 30 is a distance feed back signal, corresponding to the movement of the web 4 and is connected to the master positioner 15 via signal line 31 to form a closed loop servo drive system. The positioner 15 monitors that the appropriate acceleration and deceleration characteristics are being followed to provide the precise movement of the web for the preset length of the bag.

As more fully developed hereinafter, the positioner 15 is programmed to compute the parameters of the motor, including the acceleration, maximum speed and deceleration, just prior to the forming of each bag, and then executes that programmed move during the next cycle. This permits on-line variation in the bag length, such that it is not necessary to shut down the machine or make any change, other than for the operator to properly change the bag length on unit 24. The processor 24 will then automatically recalculate the motor drive parameter to feed the appropriate web length into the seal bar unit 5 during the dwell cycle of the seal bar unit, using the complete available time.

Figure 3A:
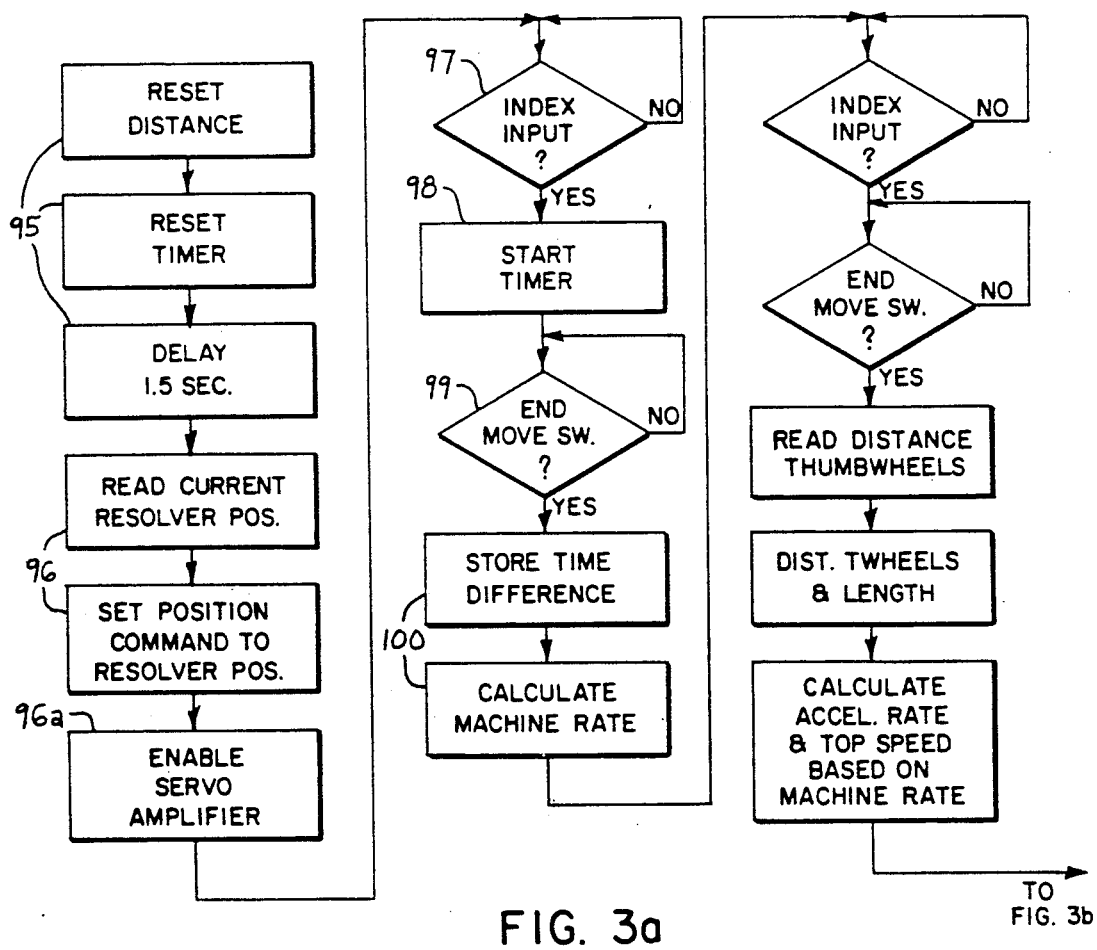
FIGS. 3a through 3b are a flow chart illustrating the software program execution for the master drive of a modified control for the system illustrated in FIGS. 1 through 2c inclusive.
Figure 3B:
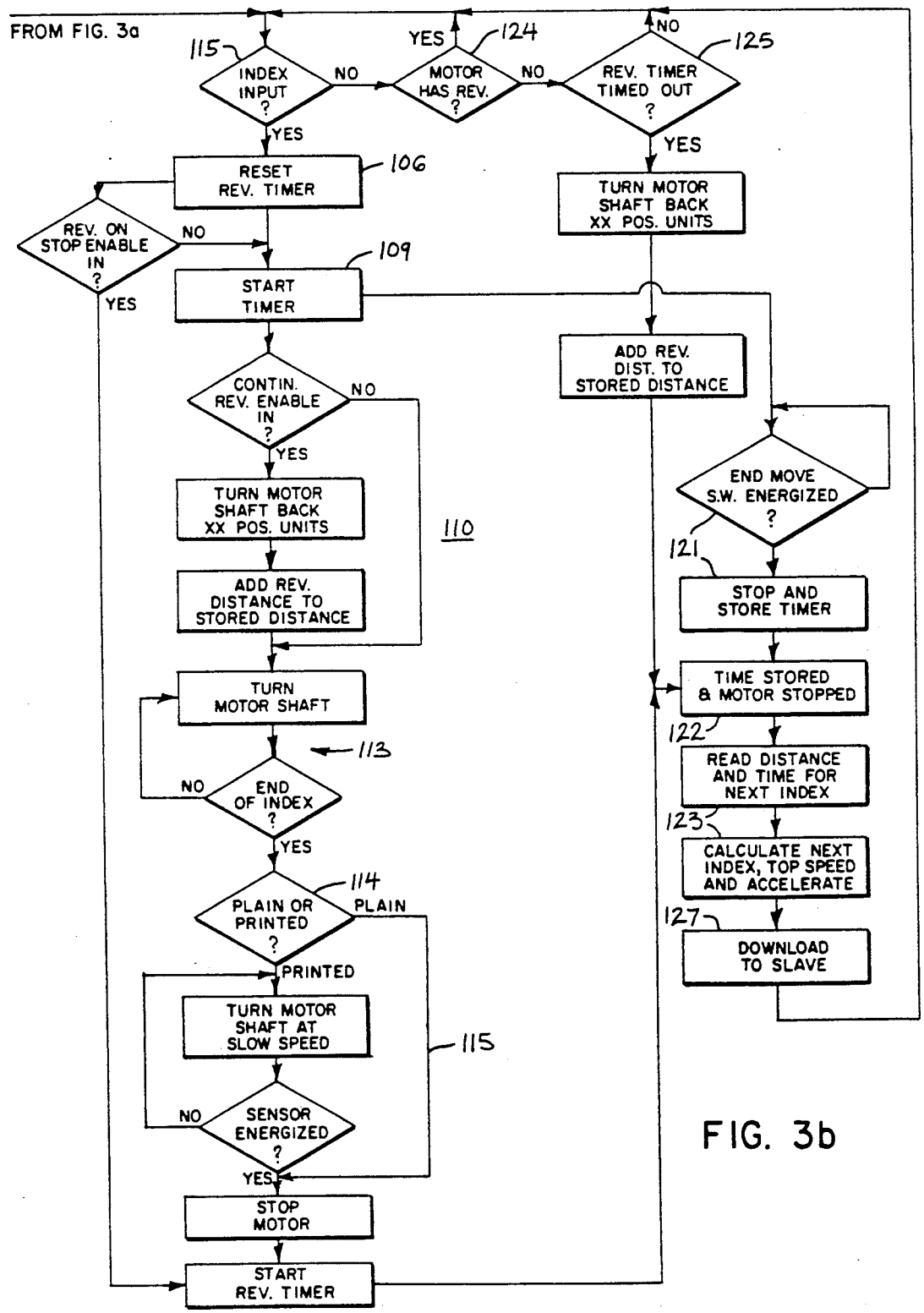

The slave motor is provided with a similar programmed positioner 16 which coupled to the master positioner 15 via a data transmitting link 32. As used herein, the master controller is defined as including the input relay and scanner control system as well as a computer based positioner programmed to calculate the profile 20-22 of FIG. 1a as well as to execute such program and drive the master draw roll motor 12 to follow such profile. The slave positioner 16 is coupled via the data link 32 to receive the profile program and to execute such program, with modification in accordance with the output of the sensor unit 35. In actual construction, duplicate computer based positioners are preferably used for positioners 15 and 16 such that they have duplicate capability. The input/output ports use plug-in or other similar connectors such that the actual functioning of each is controlled by providing the appropriate connectors and internal programs. The positioners 15 and 16 may be provided with a mode switch unit which sets the programs to the desired modes to respond the respective input/output port connections as shown in FIGS. 3a and 3b and more fully described hereinafter.

More particularly, the motor 12 and 13 are brushless AC servo motor having the output shafts coupled to the corresponding feed rolls 2 and 3. Encoder 30 and 30' provide the output corresponding to the movement of the rolls 2 and 3 and thereby the web 4.

If each set of drive rolls 2 and 3 moves the web 4 precisely the same length each web moving cycle, the web length between the rolls 2 and 3 remain constant and at the desired tension. As previously noted, all web feeding apparatus involves some deviation from the ideal web movement and the length of web movement in any given cycle may vary slightly.

Although a slight deviation in one length may be acceptable, the error is not acceptable as a continuous variation. Further, accummulated variations in successive cycles may be such as to create an unacceptable length.

With the web 4 passing through the dancer unit 7, the tension is maintained with the variation of the web length. Thus in accordance with well known functioning, the dancer unit 7 includes a plurality of spaced sets of rolls 33 and 34 over which the web 4 passes, with a moving roll unit 34 to establish and maintain the desired tension on the web by accumulating and releasing the web as necessary to establish and maintain the preset tension. The accumulation or release of web 4 is thus accomplished through the mechanical movement of the roll unit 34 within the dancer unit 7. The amplitude of the roll unit movement is directly related to the change in the web length between the draw roll units 2 and 3. A position sensing unit 35 is coupled to the dancer roll unit 7 and particularly to roll unit 34 as shown by dotted line 36. The sensing unit 35 generates a proportional control signal proportional to the web length change. This control signal is used to modify the motor drive and therefore the web feed to reset the web movement in the next indexing of the web 4 through the machine.

Generally, the motor positioners are similarly programmed by the master positioner and operate at a corresponding identical speed to provide a corresponding continuous controlled movement of the web with the constant low tension.

The output of the dancer position sensing unit 35 is coupled to the slave positioner 16 in the illustrated embodiment by a signal line 37 and the control signal is operable to modify the speed and drive profile for the downstream slave draw roll unit 3 to compensate for any erroneous length of web as reflected in the level of the control signal. Thus, the control signal is fed to the downstream processor 16 and modifies the down loaded program, and the related motion profile to either increase or decrease the web feed by the slave draw rolls 3 during the next indexing cycle. The change in web feed returns the tension control unit to its reference position, with the proper length of web 4 located between the upstream and downstream draw roll units 2 and 3

Figure 2B:
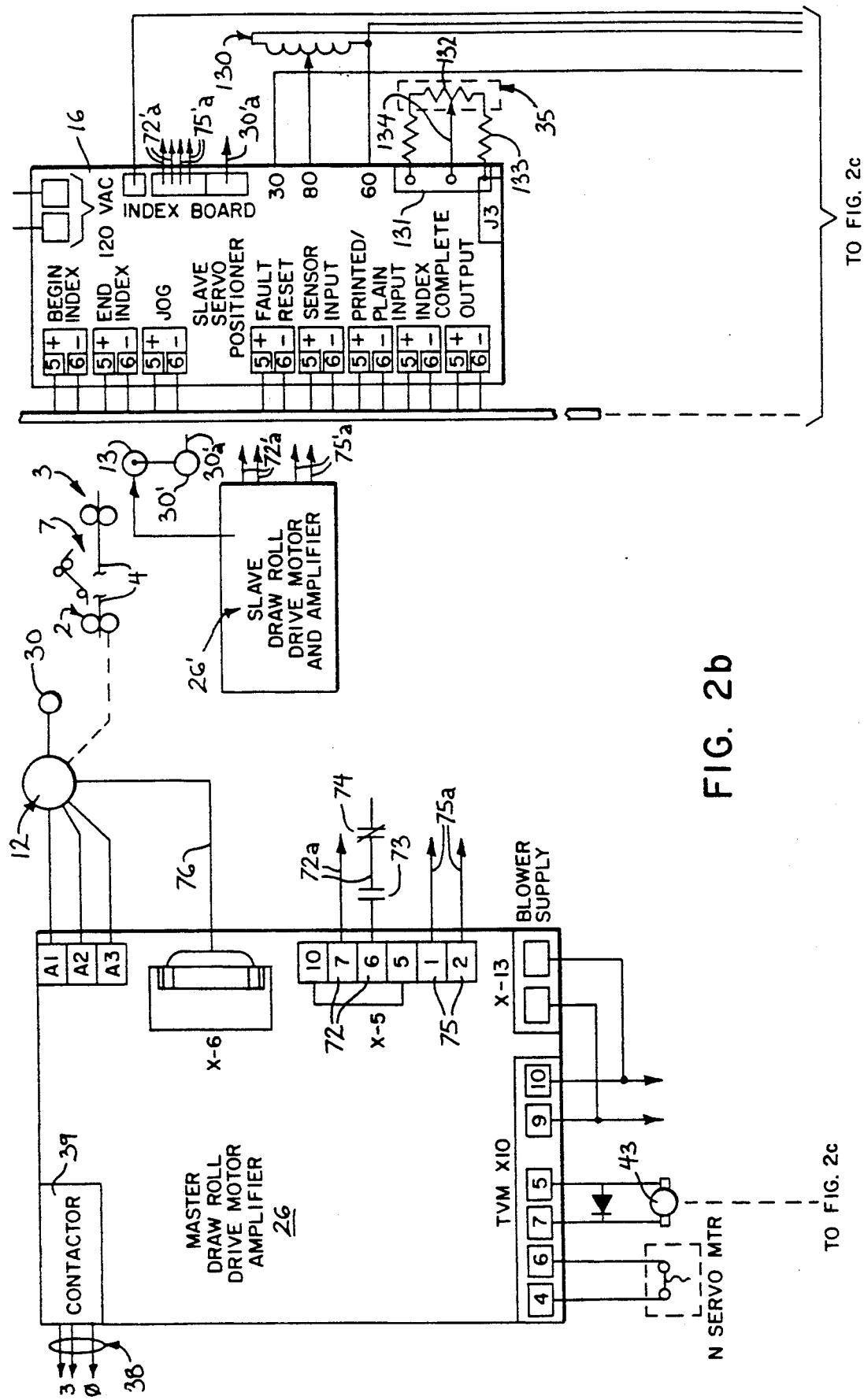
Figure 2C:
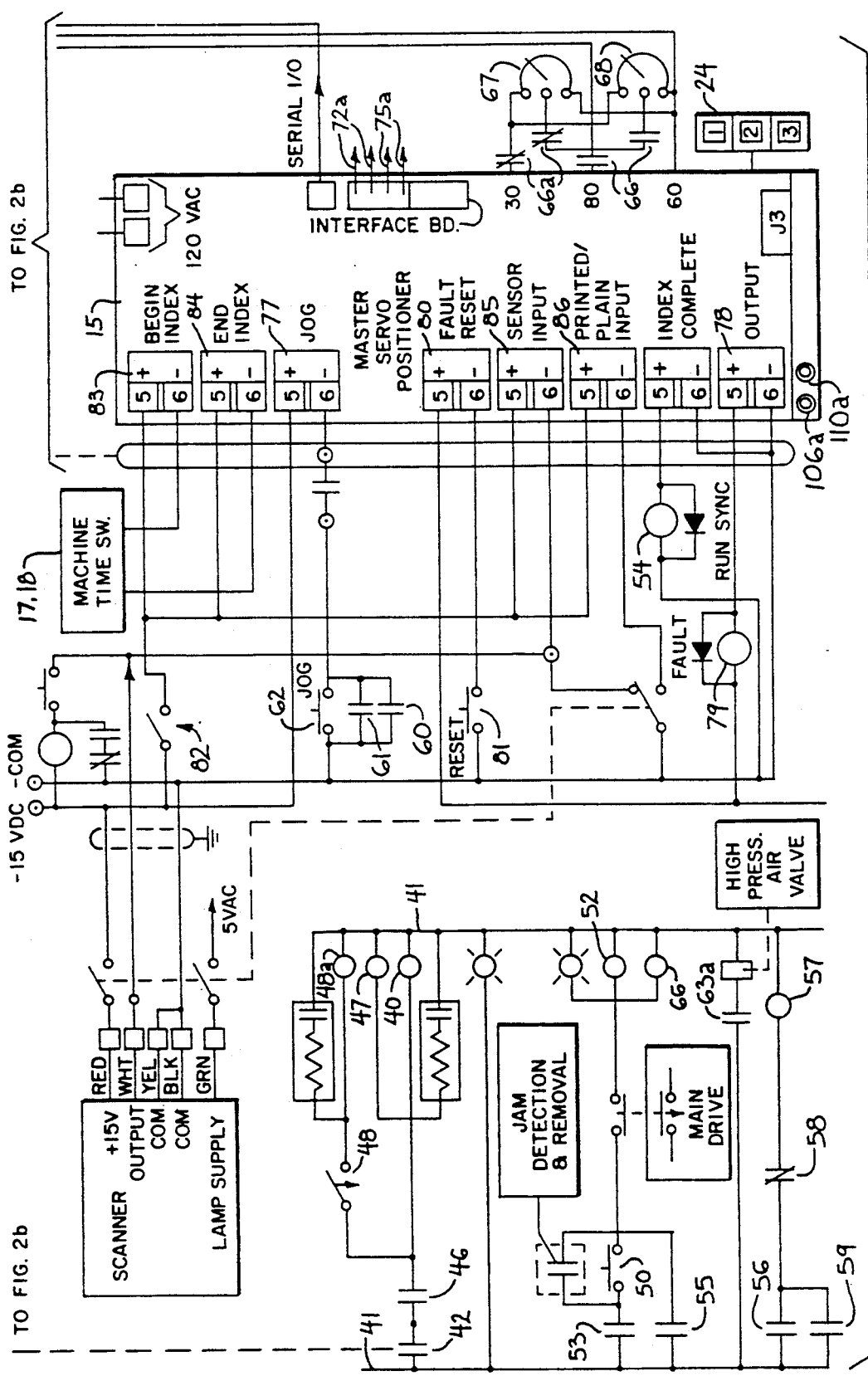

Referring to FIGS. 2b and 2c, draw roll amplifier 26 connects the motor 12 to the appropriate power supply 38 through a suitable contactor assembly 39 which preferably includes main contactor contacts and soft start contactor contacts, not shown. The amplifier 26 is coupled to the programmed controller 14 which includes the programmed positioner 15 providing the controlled and timed energization of the AC servo motor 12. The draw roll drive control circuit 39a is provided for operating of the motor contactors and operating of the feed rolls in the indexing mode, or alternately in a jog mode or continuous mode for threading the web in a stepped or continuous manner through the bag making machine. In the setup mode, the seal bar unit 5 and the dancer control signal circuit as well as similar working apparatus is disabled.

The master controller 14 is provided with the initial position of the drive motor 12 identifying the location of the draw rolls 2 and 3 and the web 4. Each incremental movement of the master servo motor 12 and encoder 30 establishes a corresponding and related movement of the draw rolls 2 and 3 and the web 4. The program generated control signal supplied to the motor amplifier 26 demands that the motor 12 move at a predetermined rate and establish a continuous new position. The output of the resolver 30 is compared to the demanded position dictated by the command signal and, if any deviation is detected, the positioner 15 calculates and establishes a new demand signal to correct such deviation.

The motor 12 and draw rolls 2 and 3 accelerate with an increasing smooth accelerated movement of the web 4 from the stop position to maximum rated speed to produce a most efficient movement of the web and then decelerates to gradually decrease the feed rate to move the web 4 the desired length at or near the end of the draw roll available time.

The motion profile may vary between an inverted V-shaped profile to the more truncated or trapezoidal profile illustrated in FIG. 1a for longer bags.

More particularly, the draw roll drive control circuit is shown in an across-the-line diagram in FIGS. 2b and 2c. A main motor contactor relay 40 is connected to a main power supply lines 41 in series with a set of normally open contacts 42 of a motor amplifier stablizing relay 43. The relay 43 is shown connected to an output port of the motor amplifier 26. When the motor amplifier 26 is powered up from the controller, a predetermined time delay period is provided during which the amplifier stablizes and then an output of the output port energizes the relay 43 to close its contacts 42 and provide power to the contactor relay 40. The circuit is shown completed through a set of normally open contacts 46 of an emergency relay, not shown, which is connected to the main bag machine drive system and operated in any suitable manner in case of an emergency condition. It may for example be actuated through a manual input, not shown. A timing relay 47 is connected in parallel with the main contactor rely 40 and actuates a set of normally open contacts 48 which are time closed to actuate a relay 48a to actuate contacts 34. In start up, the main contacts of contactor 39 close upon energization of relays 40 and 43 and provide power to amplifier 26.

A continuous run switch 50 is connected in series with a return to index switch unit 51 and a run relay 52 across the main power supply circuit. A set of sychronizing contacts 53 of a control sychronizing relay 54 are connected in the circuit to provide sychronization between the completion of an indexing cycle and conversion to a continuous run mode. The contacts 53 are normally open contacts and are closed only if the draw rolls are not moving indicating completion of an indexing cycle previously established. The continuous mode is therefore only established with the main indexing drive motor off. Energization of the run relay 52 closes a set of interlocking contacts about the sychronizing contacts 53 and the manual start switch 50. The relay 52 also closes a set of contacts 56 connected in circuit with a continuous mode relay 57 across the main incoming power lines of the control circuit. The circuit of continuous control mode relay 57 includes a set of normally closed contacts 58 coupled to the main bag drive machine for driving of the main shaft. Interlock contacts 59 are connected in parallel with the control relay contacts 56 and thus maintain the continuous mode until the machine contacts 58 open to reset relay 57. A second set of contacts 60 of the relay 57 and contacts 61 relay are connected in parallel with each other and a jog switch 62 to provide a control signal to the servo positioner 15 which establishes a continuous run signal to the amplifier 26 for establishing a continous operation of the servo motor. When in-line with an extruder, not shown, the web must be continuously fed from the extruder. The continuous run mode is particularly used in the event of a "jam" condition down stream of the web feed. The seal unit 5 is disabled and the drive units as well as other web transport drive units, not shown, are operated to remove the web with the potentiometer winding 130, forming a part of the dancer potentiometer unit 35, as more fully set forth hereinafter, of dancer unit 7 operating to trim the web. In this mode, the potentiometer winding 132 of unit 35 is inoperative and both draw roll units 2 and 3 operate with other web feed roll units in the line to clear the web from the extruder.

Thus, this mode is normally operated for a short period and the wasted web is acceptable to avoid the expense of shut down of the extruder or rethreading of the machine line.

As shown in FIGS. 1 and 2a, air nozzle units 63 and 63' are generally provided at the seal bar unit 5 with low pressure solenoid air valves which are actuated during the indexing cycle to supply low pressure air to the seal bar and assist in web processing. In the continuous run mode, nozzle units 63 and 63' are connected to a high pressure supply via a solenoid valve 64 to blow the web from the seal bar unit and insure the necessary continuous web flow during the jam removal period. Thus, as shown in FIGS. 2b and 2c, relay 52 actuates contacts 63a which actuate the solenoid valve 64 to switch nozzles 63 to a high pressure source of air, as shown. As shown in FIG. 2a, the illustrated system includes separate low pressure supply valves 65 and 65' for the respective nozzles 63 and 63'. Each valve is solenoid operated during the indexing and includes a low pressure input which is coupled to an output port to supply a regulated pressure to the nozzle 63 and 63'. An exhaust port 65a is connected to the high pressure solenoid valve 64 and when solenoid is operated, the high pressure source is coupled directly through the exhaust port to the output port and the nozzle 63 and 63' to positively remove any jam at the seal bar using continuous web flow to clear the line.

The jog mode provides for synchronized jog or independent jog movement. In the independent mode, both windings of dancer potentiometer unit 35 are inoperative and the operator can separately actuate each draw roll unit, and by visual monitoring the web, position the web. In a synchronized mode, the trim potentiometer winding 130 is operative to take-up and release web as the web is fed through the machine.

A manually controlled jog switch 62 and the relay contacts 60 and 61 provide for applying a signal to establsh the "jog" mode, or the "continuous-run" mode.

A speed adjustment relay 66 is connected in parallel with the relay 52. Relay 66 controls sets of normally closed contacts 66a and sets of normally opened contacts 66 connected respectively to a jog speed control potentiometer 67 and a continuous run speed control potentiometer 68. The relay 64 is actuated with the run relay 52 and provides for disconnection of the jog potentiometer 67 and connection of the continuous run speed potentiometer 68 in circuit under continuous run mode, and otherwise maintains the jog speed control potentiometer 67 in circuit.

The drive motor amplifier 26 is any suitable motor controller connected to a three phase power supply by the contactor assembly 34 and a 120 volt output for powering other parts of the apparatus. The internal relay 43 provides the output signal to the drive motor control circuit to insure stabilization and continued satisfactory operation of the motor amplifier during the machine operation. A bank of inputs includes a first set of input ports 72 connected to a logic and control power supply via connecting lines 72a. Line 72a includes a set of normally open contacts 73 of the relay 48a for contactor assembly 34 and a set of fault relay normally closed contacts 74 connected in the circuit to control the powering of the amplifier. A second set of input ports 75 connect the motor amplifier 26 to the servo positioner via lines 75a to receive the motor drive signal in accordance with the programmed profile for energization of the roll motor 12 and draw rolls 2 during the web feed cycle. The amplifier 26 translates the position control signal and energizes the motor 12 in accordance with the programmed profile. A commutating feedback signal from the motor 12 to the amplifier 26 via a line 76 stablizes the motor operation.

The programmed controller 14 and positioner 15 is a computer or processor based unit and includes a plurality of different plug-in inputs and output ports for providing the various operating mode including the indexing mode.

The control input for the "continuous" and "jog" modes are connected to an input unit 77. A fault control output unit 78 is connected to a fault relay 79 which is activated when a fault condition is detected by the indexer control. For example, if the web position movement is less than a preset tolerance or following error and does not respond to the increasing demand signal, relay 79 is energized. The relay 79 has the contacts 74 in the supply lines 72a to amplifier 26 which shuts down the drive in response to a fault. A fault reset unit 80 is connected to the control signal voltage in series with a reset switch 81 and serves to clear the fault condition and reset relay 79. If the fault persists, relay 79 is again actuated.

A main off/on draw control switch 82 connects the positive logic voltage supply to the indexer start and stop ports 83 and 84 connected to cycle switches 17 and 18. A photoscan sensor port 85 is connected to respond to the output of a photoscanner 16, if in circuit, and plain web input unit 86 is connected to respond when the photoscanner 16 is not activated, as more fully described in the parent application.

Upon initial machine turn on, the indexing mode of operation is set with the draw switch 82 closed.

The processor positioner 15 then executes the program as shown in FIGS. 3a and 3b including housekeeping to reset the distance and timer registers as shown at 95. The resolver 30 is read and stored as at 96, and the power amplifier 26 is enabled, as shown at 96a. The positioner 15 continuously monitors the index switches 17 and 18 coupled to the unit 5, as at 97 and when switch 17 sends a signal, a timer operates, as at 98 until the switch 18 is actuated, as at 99 to record the available time for web 4 movement. The move time is calculated and stored and the maximum machine rates is calculated, as at 100.

The master controller 14 waits for a second index cycle or pass sensed by actuation of switches 17 and 18, as at 101, and reads and stores the bag length, as at 103. As shown in the parent application, an alternate bag length feature can be provided and set at this point in the program, for subsequent execution as disclosed herein. The controller 14 then calculates the acceleration and deceleration rates as well as a top speed of the draw rolls 2 and 3 based on the machine rate as previously calculated in the first pass and the total distance of web traveled for the inserted bag length, as at 104. The indexing program then includes all of the necessary information with respect to the web movement including a preferred acceleration characteristic, maximum operating speed and the like to create the proper web motion profile.

The program as described requires two initial dry runs, that is, without forming a web to develop the motor drive program for working the web. During the second pass, the controller is executing the first pass program for the next web movement to be made. When executing the program to work the web, a second pass program is executed for the second or next web movement and a first pass program is executed for the third or the next following web movement to be formed.

The master controller 14 and particularly the processor positioner 15 executes the specific program for indexing the motor 12 and rolls 2 to move the web 4 and thereafter moves the web in a continous intermittent sequence, at each operation of switch 17, as at 105.

The executed program first resets a reverse timer 106 for spacing the web from the bar unit 5 at the last cycle in a run when a selection switch 106a (FIGS. 3a and 3b) enables the reverse cycle program. The program otherwise steps immediately back to the cycle indexing.

The index program in response to the index start signal in addition to resetting the timer 106 essentially instantaneously starts a cycle timer as at 109 which times the third or following bag cycle. After the timer is started, processor steps to the next program step shown as a continuing web reverse subroutine 110 selectively inserted by a switch 110a (FIGS. 3a and 3b). If the routine is not inserted, the program bypasses the reversing sequence and directly steps to drive the motor 12 in accordance with the programmed profile. The drive signal is thus transmitted to the motor amplifier 26 which translates the position signal from the controller to a high level output to drive the motor 12 and feed rolls 2, as shown at 113. Resolver 30 generates a continuous position related feedback signal which is fed back to the indexer positioner 15.

The motor 12 is driven until the end of the index cycle as established by the processor based on the available time and the particular setting of the several modifying and control inputs. Determination is made as to inclusion of the photoscanner 16, as at 114 and if not, the input unit removes the mark search period and automatically move the program forward, as at 115.

The programmed controller steps to the motor stop function 116 and thereby ends the basic index cycle. As previously described, the timer 109 was enabled after the resetting of the reverse timer and continues until the stop switch 18 is actuated. The time is then recorded, as at 121. This establishes the end of th cycle as at 122.

At the end of the cycle, the program controller proceeds to read the distance and time for the next index and based on the setting of the timer 109 which reflects the initial two passes and times stored at 100, and based on the setting of length switch unit 24 calculates the next index motion profile parameters, as at 123. If this is the last bag formed, a reverse drive subroutine 124 is executed to reverse the motor rotation and withdraw the web 4 slightly from the seal bar unit 5 so as to prevent welding of the web 4 end to the seal bar platen of unit 5. The subroutine 124 is a continuously monitored subloop. If an index signal is received, the reverse timer is reset and cannot time out and as set at the decision step 125, the monitoring of routine 124 continues. If the timer has not timed out, the reverse motor drive is created for fixed time and distance move as at 126 during which time the motor reverses drive rolls 2 and 3 a predetermined number of revolutions and stops. The distance moved and the motor position is stored in the program at 122 for initiating the first indexing cycle. Thus, upon start up, the web 4 must be moved the web length distance as set by the length input unit 24 plus the additional length created by web withdrawal.

When the next index cycle is generated by the rotating arm actuating of the start switch 17 at the end of a seal bar cycles, the index signal initiates the execution of the new program and moves the web 4 accordingly.

By recalculating of the index movement during each operation of the seal bar unit 5 and prior to the next index cycle, the operator can change the system on-line by merely resetting thumb wheel switch unit 24.

The slave motor 13 is driven in sychronism with motor 12. As shown in FIGS. 3a and 3b, at the end of a drive program execution and the calculation of the profile for the next cycle, the profile and drive program is down loaded to the memory of the slave positioner 16, via the data link 32, as shown at 127 in FIG. 3.

As shown in FIGS. 2b and 2c, the slave drive system includes a completely separate programmed positioner 16, but may and has been constructed with a computer or processor which is a complete duplicate of the system shown for the master controller 14 to allow reversal of the master and slave assignments.

Figure 4:
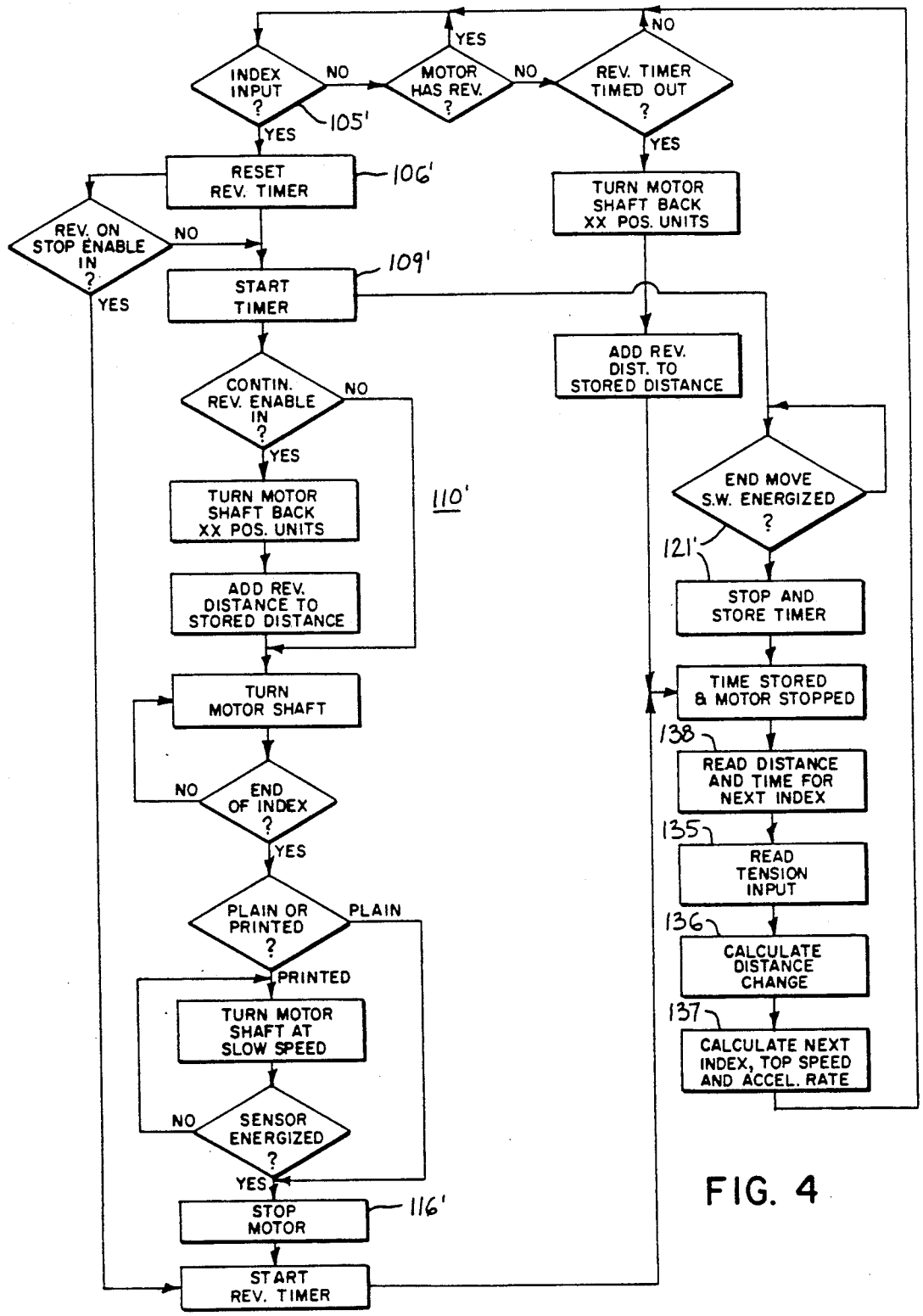
FIG. 4 is a flow chart for the software program execution for the slave drive of the system illustrated in FIGS. 1 through 2c inclusive.

The slave positioner in the illustrated embodiment of FIG. 4 does not execute the multiple passes of the program for calculating the acceleration rate and the like as shown at 95 through 104 of FIGS. 3a and 3b. Further, the program to be executed would not necessarily include the section for reversing of the bag and the like. The program execution is the same as in FIGS. 3a and 3b and corresponding primed numbers are used in FIG. 4 for simplicity and description, with the variation required by the web length adjustment described, as shown in FIGS. 1, 2a, 2b and 4.

The slave positioner is connected to the jog and continuous feed circuit to receiving corresponding signals, as shown in FIG. 4. A trim drive side tension potentiometer 130, forming a part of potentiometer unit 35, is connected in parallel with the signal portion of the jog and the continuous run potentiometers of the master positioner 15 to provide a balance signal input. The potentiometer 130 compensates for positioning of an infeed-dancer unit and potentiometer unit mounted to the infeed side of the feed rolls 2. The potentiometer 130 is connected in the circuit of slave positioner 16 in the continuous run mode.

The slave positioner 16 further includes a separate profile modifying input port 131 connected to the tension potentiometer 35 of the dancer 33. In the illustrated embodiment of the invention, the potentiometer 35 includes a potentiometer winding 132 connected to the servo positioner port in series with appropriate resistors 133 connected to the opposite side of the potentiometer. The signal lead 134 of the potentiometer 35 is connected directly as an input to the servo positioner and introduces the analog voltage signal. With the tap 134 at the center of the potentiometer winding 132, as illustrated in FIGS. 2b and 2c, a zero or reference voltage signal is applied to the servo positioner 16 indicating a proper web length exists between the draw rolls 2 and 3. The slave motion profile for motor 13 is then the duplicate of the profile generated by the master servo positioner 15. If the dancer unit 35 moves to take up or release web, the reference roll unit 34 moves from its reference position with a corresponding movement of the potentiometer tap 134. Thus, if the web length increases, the potentiometer tap move in one direction, for example, upwardly, on the potentiometer winding and proportionately changes the analog voltage signal to the slave positioner. The slave positioner in reading the voltage detects the change in value as corresponding to a proportionate length. The direction of change is also detected by the direction of the voltage change. The control signal information is that the web length has increased and that at the next index, the draw rolls 3 move a greater length of the web 4 to provide the desired positioning of the new web at the proper length between the draw rolls.

Conversely, if the dancer has released web material thereby reducing the length from the preset length, the potentiometer tap moves in the opposite direction providing a corresponding proportional analog signal indicative of the reduced length to the slave positioner. At the final program step 123', the positioner 16 calculates the modified profile to automatically compensate for such reduced length and changes the profile to decrease the length of material moved by draw rolls 3 thereby resets the length of web between the nip rolls 2 and 3 to the proper length.

More particularly, with reference to FIG. 3, the only change in the master program includes the step 127 of down loading the calculated next profile program to the memory unit of the slave positioner 16, which is executed after calculating the next index profile.

The slave drive flow chart in FIG. 4 thus mimics the master drive chart and if the proper length of web is present between the master draw rolls and the slave draw rolls executes the identical drive program. If there is any change in the web length, either longer or shorter, the output of the dancer potentiometer 35 provides a modifying signal to the slave motor positioner 16, as shown in FIG. 4. Referring to FIG. 5, the positioner 16 reads the setting of winding 132 potentiometer unit 35 via the signal line 37 (FIG. 1), as at 135, and then proceeds to calculate and store the required distance or length of web change required, if any, as at 136. If any change is required, the positioner 16 calculates the next index top speed and acceleration and deceleration rates, as at 137 based on the modifying information from step 136 and the down-loaded information at step 138 which includes the web length and time for the next index as down-loaded from the master positioner 15.

The down-loaded index profile length is thereby directly modified by the slave positioner 16 in accordance with the output voltage control signal of the dancer potentiometer 35.

The slave program maintains an identical start step 105' responsive to switch 17 but changes the profile within the available time to adjust the web length moved by the slave draw rolls 3 in relationship to the master draw rolls 2 so as to adjust the web length and reset the dancer position on the next subsequent index. Returning of the dancer potentiometer to the reference position on the next subsequent index resets the system such that the master positioner and the slave positioner duplicate the programs such that the slave drive precisely mimics the indexing of the master servo drive.

The master positioner and the slave positioner can be set in the jog or thread position through the master switches, as previously described.

In the illustrated embodiment of the invention, modification of the slave index profile is shown responsive to the dancer potentiometer. Any other means of control including a manual input can be provided, in addition to or in place of the dancer potentiometer. Similarly, an analog signal generator or any other suitable can be incorporated for purposes of controlling the web feed in accordance with a change in the length of web between the two spaced draw rolls or other drive units.

Thus, a non-contact sensing device can be coupled to the web to respond to the change in length. For example, a loop in the web can be created, the length of which will vary with the length of the web between the nip rolls. A non-contacting sensing device such as an ultrasonic sensor, a photodetector or even a thermosensor can be used to detect the location of the loop and generate an output control signal to the slave positioner. In addition, a suitable tension measuring device can be coupled to the web between nips of the the draw rolls 2 and 3 or other drive units with a selection control to permit running with more or less tension than that set by the illustrated dancer unit.

Although shown in a web length control, the apparatus can be operated to establish and maintain a constant tension in the web. Thus, if a web tension load cell is coupled to the web, the feed back signal can be applied to the web feed draw roll unit to vary the drive to maintain a particular tension on the web independent of the length of the web. Further, any other web characteristic could be monitored and used to control the web feed to maintain such characteristic in the dual web feed system.

Further, the dual drive system with the programmed positioning units may, by appropriate computer based systems, provide for direct communication between the positioning units such that the designated master positioning unit can monitor slave functioning of the slave unit to insure proper drive of the web material by the otherwise two independent drive.

Although the illustrated system also provides modification of the slave profile, the system by appropriate programming could provide modification of either or both profiles. In addition, by use of a high speed computer based system, the drive units could be modified during the executed drive cycle in addition to or in place of the next cycle modification.

Various modes of carrying out the invention are contemplated as being within the scope of the following claims particularly pointing out and distinctly claiming the subject matter which is regarded as the invention.

I claim:

1. A multiple drive apparatus for transport of successive predetermined lengths of a web, comprising a first and second drive units coupled to the web in longitudinally spaced relation for moving said web, separate control units for establishing a timed drive profile of the drive units including an acceleration and deceleration period to sequentially and cyclically move said web within a selected web moving period, a web length monitor unit coupled to said web between said first and second drive units to sense any change in the length of said web between said drive units, said monitor unit establishing an output signal proportional to the direction of the change and to the length of said change, at least one of said control units including a drive modifying unit connected to said monitor unit and responsive to said output signal to change the drive profile of the connected control unit for a subsequent succeeding web feed to compensate for the change in web length and move the web in accordance with the modified drive profile.

2. The multiple drive apparatus of claim 1 wherein said drive units include first and second web draw roll units coupled to the web in spaced relation, said separate drive units including a first servo drive unit connected to said first draw roll unit, a second servo drive unit connected to said second draw roll unit, said separate control units connected to the corresponding draw roll unit.

3. The drive apparatus of claim 2 wherein said first and second control units include programmable positioners having an output connected respectively to said first and second servo drive units and including corresponding drive profile programs, said monitor unit connected to one of said programmable positioners and having an internal program to modify said drive profile program.

4. The drive apparatus of claim 3 wherein said one programmable positioner includes a program coupled to said drive units to generate said drive profile program, and having a data transmitting unit connecting said programmable positioners and programmed to down load said drive profile program to said second servo drive unit and thereby duplicate said timed energization of said first servo drive unit.

5. A multiple drive apparatus for transport of successive predetermined lengths of a web, comprising a first web drive roll unit including a first drive control unit and a web coupling unit for moving the web, a second web drive unit including a second drive control unit and a web coupling unit for moving the web in spaced relation to said first web drive unit, a position control unit connected to said first drive control unit establishing a timed drive profile of the web coupling unit including an acceleration and deceleration period to move said web within a predetermined period of each cycle, a second position control unit connected to said second web coupling unit establishing a programmed drive section connected to said second drive control unit and programmed to duplicate said timed drive profile of said first web coupling unit, a web length monitor unit coupled to said web between said first and second drive units to sense any change in the length of said web, said monitor unit establishing an output signal proportional to the direction of the change and to the length of said change, one of said position control units including a drive modifying unit connected to said monitor unit and responsive to said output signal to change the drive profile of the one of said position control units for the next succeeding web feed to compensate for the change in web length and move the web in accordance with the modified drive profile.

6. A multiple drive apparatus for transport of successive predetermined lengths of a web, in succeeding cycles each having a web moving period comprising a first web draw roll unit coupled to the web, a second web draw roll unit coupled to the web in spaced relation to said first web draw roll unit, a first servo drive unit connected to said first draw roll unit, a second servo drive unit connected to said second draw roll unit, a programmed controller connected to said first servo drive unit for establishing a timed energization of the drive unit with a drive profile including an acceleration and deceleration period to move said web within the web moving period of each said cycle, a position control unit connected to said second servo drive unit and having a programmed drive section connected to said programmed controller and programmed to duplicate said drive profile of said first servo drive unit, a web length monitor unit engaging said web between said first and second draw roll units to sense any change in the length of said web, said monitor unit establishing an output signal proportional to the direction of the change and to the length of said change, said position control unit including a drive modifying unit connected to said monitor unit and responsive to said output signal to change the drive profile of the second servo drive unit for the next succeeding web feed to compensate for the change in web length and move the web in accordance with the changed drive profile.

7. The multiple drive apparatus of claim 6 having a web cycle control unit including a web moving cycle and a web stop cycle and wherein said programmed controller is a programmable controller including a program generator for generating a drive defining said drive profile, said profile program for establishing said drive profile and having present length inputs and timing inputs from the web cycle control unit, said controller generating said drive during each stop cycle.

8. The apparatus of claim 6 wherein said position control unit is a programmable controller including a program generator with a time-motion profile generating program for generating said drive profile.

9. The apparatus of claim 6 wherein said programmed controller includes a drive program defining said drive profile and including a data link between said programmed controller and said position control unit to down-load said program to said position control unit.

10. The apparatus of claim 6 wherein said web length monitor unit includes a tension control unit engaging said web between said first and second draw roll units to sense any change in the length of said web, a signal generator coupled to said tension control unit and establishing said output signal proportional to the direction of the change and to the length of said change, said position control unit including a drive modifying unit connected to said signal generator to change said drive profile of said second servo drive unit.

11. The apparatus of claim 10 wherein said tension control unit is a dancer unit having a movable roll unit, and said signal generator is coupled to said movable roll units.

12. The apparatus of claim 11 wherein said signal generator is a potentiometer having a movable output tap connected to said position control unit.

13. A method of intermittently and cyclically moving a web of indefinite length and including spaced first and second drive units coupled to the web, comprising operating said drive units to move the web in a series of web feed cycles each having a fixed time, each of said drive units adapted to produce equal drive profiles including an acceleration period and a deceleration period for moving the web a predetermined length in each web feed cycle, monitoring the length of said web between said drive units during each web feed cycle, and modifying the drive profile of one of said drive units for the next succeeding web movement in the subsequent web feed cycle to compensate for any change in the length of said web from said predetermined length and thereby the position of said moving web in said subsequent web feed cycle.

14. The method of claim 13 having a tension control unit coupled between said first and second drive units to maintain a selected web tension and responding to a change in length of web by take-up and release of the web between said drive units, and wherein said monitoring step includes monitoring the state of said tension control unit and establishing an output signal proportional to said change in the length of the web, and said modifying drive profile is in accordance with said output signal and change in the tension control unit.

15. The method of claim 13 including generating a new web drive profile for the first drive unit during the movement of the web in a feed cycle for the next web feed cycle, duplicating said new web drive profile for the second of said drive units, and said modifying of the drive profile being impressed on the duplicated drive profile.

16. A method of intermittently and cyclically moving a web of indefinite length in a continuous series of cycles with each cycle including a stop web period and a move web period and having spaced first and second drive units coupled to the web and having a tension control unit coupled to the web between said spaced drive units, and said tension control unit having at least one moving member engaged by said web between said drive units and positioned by said web to maintain web tension with changes in web length between said drive units, each of said drive units having a power input controlling the output speed of the drive units, comprising operating said drive units and thereby moving the web including a first cycle, generating a drive power profile for energizing each of said drive units with varying energy input including an acceleration period and deceleration period to use a selective portion of the next move web period of the next cycle for moving the web, storing said drive power profile for said next move web period of the next cycle, monitoring the position of said moving member of said tension control unit during each cycle and establishing an output signal proportional to the change in the web length, and modifying the drive power profile of one of said drive units for the next move web period of the next cycle in accordance with said signal to compensate for any change in the position of said moving member.

17. In the method of claim 16 having a separate programmable controller unit for each of said drive units and establishing a varying energization for generating said drive profile, wherein said storing of said drive power profile and modifying the drive power profile for the next cycle includes operating one of said programmable controller units during web moving to generate a new program of the drive power profile for the next cycle, down-loading said new program to the second programmable controller, and said modifying step including modifying said down-loaded new program for the next cycle.

* * * * *